(12) United States Patent
Van Niekerk et al.

(10) Patent No.: US 10,655,660 B2
(45) Date of Patent: May 19, 2020

(54) COMPONENT CONNECTION AND METHOD FOR THE PLASTIC FORMING OF A BALL

(71) Applicant: Bayerische Motoren Werke Aktiengesellschaft, Munich (DE)

(72) Inventors: Johann Van Niekerk, Munich (DE); Maik Hammer, Bruckberg (DE); Clemens Stefanziosa, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 486 days.

(21) Appl. No.: 15/403,227

(22) Filed: Jan. 11, 2017

(65) Prior Publication Data

US 2017/0122352 A1 May 4, 2017

Related U.S. Application Data

(63) Continuation of application No. PCT/EP2015/066757, filed on Jul. 22, 2015.

(30) Foreign Application Priority Data

Aug. 13, 2014 (DE) ........................ 10 2014 216 001

(51) Int. Cl.
 *B23K 20/10* (2006.01)
 *F16B 5/04* (2006.01)
 (Continued)

(52) U.S. Cl.
 CPC ................ *F16B 5/04* (2013.01); *B23K 20/10* (2013.01); *B23K 20/106* (2013.01); *B29C 65/08* (2013.01);
 (Continued)

(58) Field of Classification Search
 CPC . F16B 5/04; F16B 5/08; B29C 65/603; B29C 65/082; B29C 65/08; B29C 66/863;
 (Continued)

(56) References Cited

U.S. PATENT DOCUMENTS 2,652,733 A * 9/1953 Gilda ...................... B25B 27/00
 29/275
2,956,469 A * 10/1960 Johnson ................ F16B 19/125
 411/20

(Continued)

FOREIGN PATENT DOCUMENTS

CN 1368605 A 9/2002
DE 38 17 119 A1 12/1988
 (Continued)

OTHER PUBLICATIONS

German-language Office Action issued in counterpart German Application No. 10 2014 216 001.4 dated Jun. 12, 2015 (6 pages).

(Continued)

*Primary Examiner* — Kiley S Stoner
(74) *Attorney, Agent, or Firm* — Crowell & Moring LLP

(57) ABSTRACT

A method is provided for plastic forming of a ball which forms a connecting element or part of a connecting element intended for connecting at least two components. At least some of the energy required for the plastic forming of the ball is introduced into the ball by way of ultrasound.

17 Claims, 2 Drawing Sheets

(51) Int. Cl.
  *B29C 65/08* (2006.01)
  *B29C 65/60* (2006.01)
  *F16B 5/08* (2006.01)
  *B29L 31/00* (2006.01)
  *B29C 65/00* (2006.01)
  *B29C 65/78* (2006.01)

(52) U.S. Cl.
  CPC .......... *B29C 65/082* (2013.01); *B29C 65/603* (2013.01); *F16B 5/08* (2013.01); *B29C 65/601* (2013.01); *B29C 65/7847* (2013.01); *B29C 66/1122* (2013.01); *B29C 66/21* (2013.01); *B29C 66/41* (2013.01); *B29C 66/474* (2013.01); *B29C 66/721* (2013.01); *B29C 66/81423* (2013.01); *B29C 66/81431* (2013.01); *B29C 66/8322* (2013.01); *B29C 66/863* (2013.01); *B29L 2031/737* (2013.01)

(58) Field of Classification Search
  CPC .......... B29C 66/8322; B29C 66/81431; B29C 66/81423; B29C 66/721; B29C 66/474; B29C 66/41; B29C 66/21; B29C 66/1122; B29C 65/7847; B29C 65/601; B29L 2031/737; B23K 1/06; B23K 20/10–206
  USPC .................. 228/110.1, 1.1; 156/73.1–73.6, 156/580.1–580.2
  See application file for complete search history.

(56) References Cited

U.S. PATENT DOCUMENTS

| | | | |
|---|---|---|---|
| 3,319,984 A | | 5/1967 | Jones et al. |
| 3,499,808 A * | | 3/1970 | Obeda ................ B29C 65/08 156/580.2 |
| 3,561,102 A * | | 2/1971 | Diemer ................ B21J 15/02 29/509 |
| 3,904,440 A * | | 9/1975 | Hess ................ B23K 11/004 219/85.19 |
| 4,106,962 A * | | 8/1978 | Adams ................ B29C 37/0085 156/73.1 |
| 4,532,166 A * | | 7/1985 | Thomsen ................ B29C 65/08 428/137 |
| 4,859,378 A * | | 8/1989 | Wolcott ................ B29C 65/08 264/445 |
| 4,865,680 A * | | 9/1989 | Pierson ................ B29C 65/08 156/580.2 |
| 4,865,687 A | | 9/1989 | Pierson |
| 5,361,483 A | | 11/1994 | Rainville et al. |
| 6,309,490 B1 * | | 10/2001 | Davis ................ B29C 65/08 156/251 |
| 6,503,585 B1 * | | 1/2003 | Wagenblast ...... B29C 45/14467 108/51.11 |
| 10,391,545 B2 * | | 8/2019 | Kuniyil ................ B21J 15/02 |
| 2003/0062110 A1 * | | 4/2003 | Urlaub ................ B06B 3/02 156/73.1 |
| 2003/0159274 A1 | | 8/2003 | Isobe |
| 2003/0170422 A1 | | 9/2003 | Heta et al. |
| 2009/0169325 A1 * | | 7/2009 | Avila Gutierrez ...... B29C 65/08 411/82 |
| 2009/0211077 A1 * | | 8/2009 | Wein ................ B29C 65/607 29/525.07 |
| 2014/0230994 A1 * | | 8/2014 | Riehm ................ B29C 65/08 156/73.1 |
| 2016/0061245 A1 * | | 3/2016 | Toyozumi ............ B29C 65/08 411/82 |
| 2016/0158877 A1 * | | 6/2016 | Ballough ............ B23K 20/10 228/1.1 |
| 2017/0120504 A1 * | | 5/2017 | Stefanziosa ............ B29C 65/08 |
| 2017/0173660 A1 * | | 6/2017 | Tochiki ................ B21D 7/00 |
| 2017/0361540 A1 * | | 12/2017 | Li ................ B23K 20/22 |

FOREIGN PATENT DOCUMENTS

| | | |
|---|---|---|
| DE | 10 2004 025 492 A1 | 8/2009 |
| DE | 10 2014 211 660 A1 | 12/2015 |
| FR | 2 241 710 A1 | 3/1975 |
| JP | 2003-231181 A | 8/2003 |
| WO | WO 2011/073393 A2 | 6/2011 |

OTHER PUBLICATIONS

International Search Report (PCT/ISA/210) issued in PCT Application No. PCT/EP2015/066757 dated Oct. 7, 2015 with English translation (6 pages).
German-language Written Opinion (PCT/ISA/237) issued in PCT Application No. PCT/EP2015/066757 dated Oct. 7, 2015 (6 pages).
Chinese-language Office Action issued in counterpart Chinese Application No. 201580026286.3 dated Jan. 26, 2018 with English translation (Seventeen (17) pages).
German-language European Office Action issued in European Application No. 15 742 216.3 dated Mar. 28, 2019 (five pages).

* cited by examiner

COMPONENT CONNECTION AND METHOD FOR THE PLASTIC FORMING OF A BALL

CROSS REFERENCE TO RELATED APPLICATIONS

This application is a continuation of PCT International Application No. PCT/EP2015/066757, filed Jul. 22, 2015, which claims priority under 35 U.S.C. § 119 from German Patent Application No. 10 2014 216 001.4, filed Aug. 13, 2014, the entire disclosures of which are herein expressly incorporated by reference.

This application contains subject matter related to U.S. application Ser. No. 15/403,236, entitled "Sonotrode, Method for Welding a Ball, and Component Connection" filed on Jan. 11, 2017.

BACKGROUND AND SUMMARY OF THE INVENTION

The present invention relates to a component connection including a first component having a through-hole, and a second component having a hole, and a connecting element connecting the two components. The present invention also relates to a method for the plastic forming of a ball.

A component connection of this type and a method of this type are known from the prior, non-previously-published, German patent application DE 10 2014 211 660.

Rivets in a wide variety of shapes and manifestations have already been used for more than a hundred years for the connection of components. When riveting components, a rivet is inserted into holes which are oriented concentrically in relation to one another and are provided in the components to be connected to one another. The rivet is plastically deformed by the application of a pressure or a force.

It is an object of the invention to provide a component connection in which two components are connected to one another in a different, cost-effective manner. It is a further object of the invention to specify a method which is suitable therefor.

This and other objects are achieved by a component connection as well as a method for plastic forming of the ball in accordance with embodiments of the invention.

The starting point of the invention is a component connection, including a first component having a through-hole, and a second component having a hole. The hole provided in the second component may likewise be a through-hole or a simple blind hole. The component connection further includes a "connecting element" connecting the two components. There is a form fit between the connecting element and at least one of the two components. Furthermore, it can be provided that there is a frictional connection between one or both components and the connecting element. Furthermore, it can be provided that there is a form fit and possibly also a frictional connection between the connecting element and both components.

An aspect of the invention consists in the fact that the connecting element or part of the connecting element has been produced by ultrasonic plastic deformation of a ball. "Starting material" of the connecting element may therefore be a ball, or part of the connecting element may be formed initially by a ball. "Starting material" therefore does not necessarily have to be a simple ball. It is also contemplated for the ball to be part of a more complex element (e.g. a bolt or the like may protrude from the ball).

Ultrasonic energy is introduced into the ball by way of an ultrasonic sonotrode and makes the ball undergo vibrations to such an extent that it becomes at least so "soft" that it can be plastically deformed. After the plastic deformation of the ball, the latter adopts a shape which projects over the through-hole provided in the first component in a form-fitting manner or like a rivet and extends through the through-hole provided in the first component into the through-hole provided in the second component. As has already been mentioned, a frictional connection may arise between the connecting element, formed from the ball by forming of the ball, and the second component. If the hole provided in the second component is likewise a through-hole, it can be provided that the plastically deformed connecting element extends through the two holes and projects over both holes in a form-fitting manner or like a rivet.

A significant advantage of the invention consists in the fact that the balls (irrespective of the material of the balls) are generally extremely inexpensive mass-produced goods, which can be purchased "at price per kilo". The invention is therefore suitable in particular for high-volume applications.

On account of the complete symmetry of a ball, the latter can be "shaped" or deformed very easily by way of a spherical segment-shaped sonotrode. By way of example, a ball can be sucked in by way of a suction device which is integrated in the sonotrode or is arranged on the sonotrode, "softened" by ultrasound, and then shaped, i.e. deformed. This operation can be effected in a fully automated manner by use of a robot.

The invention can be employed in conjunction with a very wide variety of ball materials. The ball can consist of a plastics material, for example. As an alternative thereto, the ball can also consist of a metal or of an alloy. The invention can be employed in particular in conjunction with aluminum balls, copper balls or steel balls.

The invention is also universally usable with respect to the materials of the two components. By way of example, the first and/or the second component can consist of a metal, for example steel or aluminum, or of plastic, in particular of a fiber-reinforced plastic. In particular, the first component can consist of a different material to the second component ("mixed construction connection").

One of the components or both components may be body components of a vehicle. However, the invention can be used not only in vehicle construction but also quite generally, where what is involved is the connection of two components to one another in a simple and cost-effective manner.

The ball can be made to undergo vibrations by way of a sonotrode. By way of example, it is contemplated that the direction of vibrations of the sonotrode is parallel to an axis running through the center points of the two holes, i.e. substantially perpendicular to the two components in the region of the holes. As an alternative thereto, this can also be carried out using a "rotary sonotrode", which makes the ball undergo torsional vibrations ("twisting ultrasound").

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
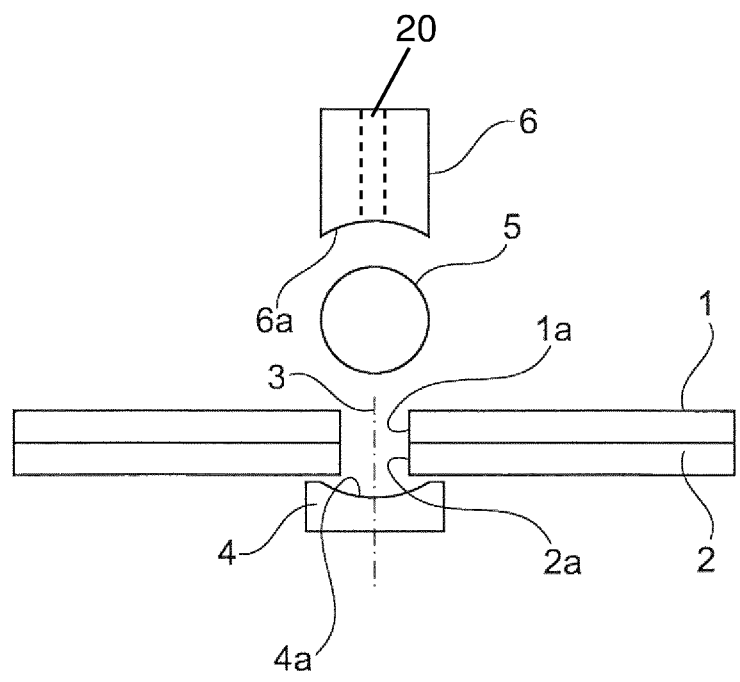
FIGS. 1 and 2 show an exemplary embodiment according to the invention, in which two components are connected to one another from two sides by the plastic deformation of a ball.

FIG. 1 shows two components 1, 2 resting against one another. A first through-hole 1a is provided in the first component 1. A second through-hole 2a is provided in the second component 2. The two components 1, 2 are positioned on one another in such a way that the two through-holes 1a, 2a are oriented concentrically in relation to one another, this being indicated by the perpendicular bisector 3, which is shown in dashed-dotted form and extends through the center points of the two holes 1a, 2a.

A die-like tool 4 having a trough-like recess or indentation 4a is applied from a bottom side of the component 2.

A ball 5 is positioned from the side of the first component 1. In the case of the arrangement shown in FIG. 1, the diameter of the ball 5 is greater than the diameter of the through-hole 1a. The ball 5 is placed onto the through-hole 1a and made to undergo oscillations by way of an ultrasonic sonotrode 6. The ultrasonic sonotrode 6 has a spherical segment-shaped recess 6a, which rests from the outside on the ball 5. By use of the ultrasonic sonotrode, the ball 5 can be made to undergo vibrations which are parallel to the axis 3, or, as an alternative thereto, can be made to undergo torsional or roational vibrations which vibration about the axis 3. By use of the ultrasonic sonotrode 6, so much energy is introduced into the ball 5 that the latter becomes "soft" and can be plastically deformed. By pressing the ultrasonic sonotrode 6 and the die-like tool 4 together, the ball 5 is deformed into the through-holes 1a, 2a. In the region of the top side of the component 1 and in the region of the bottom side of the component 2, the ball is deformed according to the spherical segment-shaped recess 6a provided in the ultrasonic sonotrode 6, or, respectively, according to the recess 4a in the die-like tool. A connecting element 5' which projects over the two through-holes 1a, 2a like a rivet is therefore formed from the ball 5, this being shown in FIG. 2.

The underlying method can be carried out in a fully automated manner by use of a robot which guides the ultrasonic sonotrode. By way of example, the ball 5 can be sucked in from a storage vessel by way of a suction device (20, shown in dashed lines) which is integrated in the sonotrode 6 or is arranged on the sonotrode 6, and positioned onto the through-hole 1a. Similarly under the control of a robot, the sonotrode 6 and the die-like tool 4 can then be pressed against one another.

Figure 2:
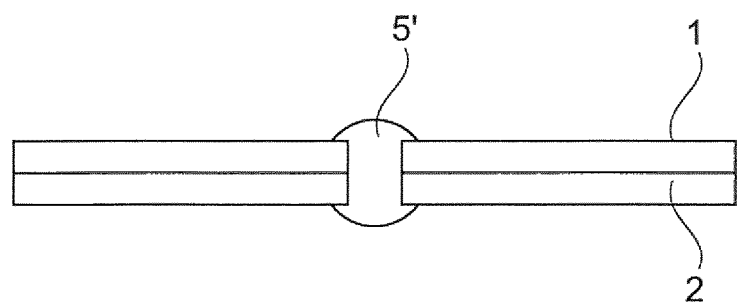
Figure 3:
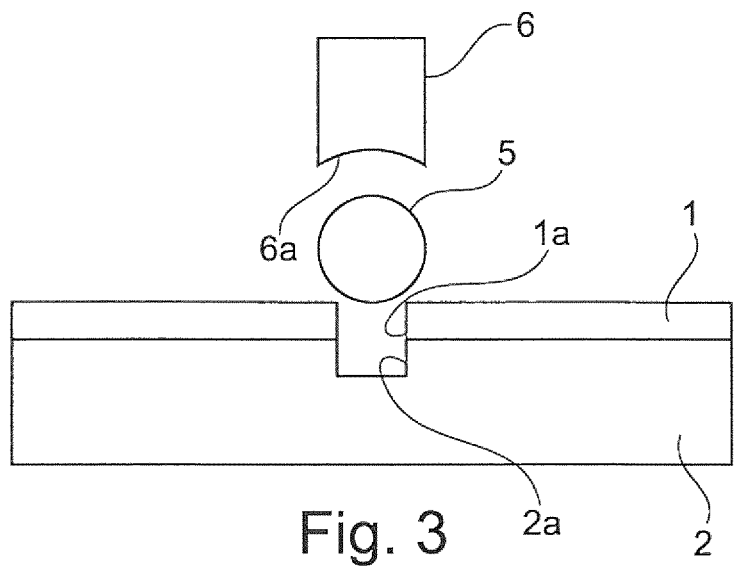
FIGS. 3 and 4 show an exemplary embodiment, in which two components are connected to one another by the deformation of a ball on one side.
Figure 4:
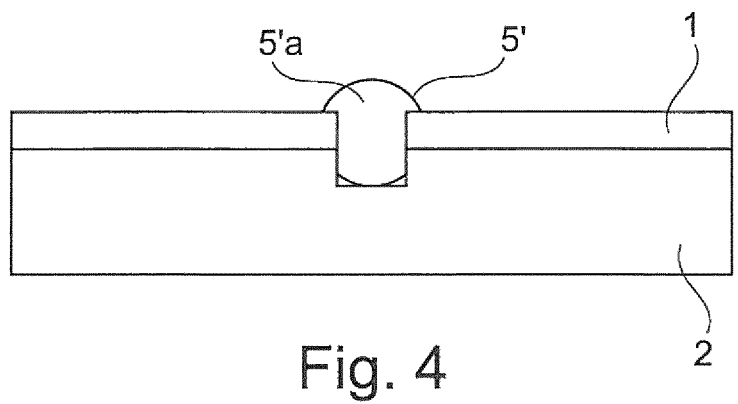

FIGS. 3 and 4 describe an exemplary embodiment in which two components 1, 2 are connected to one another by "one-sided joining". Here, too, a through-hole 1a is provided in the first component 1. In contrast to the exemplary embodiment shown in FIGS. 1 and 2, merely a blind hole is provided in the second component 2.

In a manner which is quite similar to the exemplary embodiment shown in FIGS. 1 and 2, a ball 5 is "softened" by useously of an ultrasonic sonotrode 6 and plastically deformed through the through-hole 1a and into the blind hole 2a by pressing the ultrasonic sonotrode 6 onto the ball 5, giving the rivet-like connecting element 5' shown in FIG. 4 which arises from the ball 5. In a manner similar to that in the exemplary embodiment shown in FIGS. 1 and 2, the connecting element 5' has a mushroom-like or hat-like head 5'a, which projects over the through-hole provided in the first component 1 in a form-fitting manner. By pressing in the ball material, a frictional connection is formed between the connecting element 5' and the second component 2, or the blind hole 2a provided therein.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for plastic forming of a ball that forms a connecting element, or part of a connecting element, provided to connect two components, the method comprising the acts of:
    introducing energy, via ultrasound, into the ball for the plastic forming of the ball; and
    connecting the two components using the plastically formed ball, wherein
        the two components each have a hole and are oriented in relation to one another such that the two components rest against one another,
        the holes of the two components are arranged substantially concentrically in relation to one another, and
        the ball has a shape and size that prevents the ball from spanning through the two components, prior to the introducing energy.

2. The method according to claim 1, wherein the energy is introduced into the ball via an ultrasonic sonotrode, the ultrasonic sonotrode being set directly onto the ball.

3. The method according to claim 1, wherein the ball is made of a plastics material.

4. The method according to claim 1, wherein the ball is made of a metal or of an alloy.

5. The method according to claim 1, wherein the ball is made of aluminum, copper, or steel.

6. The method according to claim 1, wherein
    the ball is made to undergo vibrations via an ultrasonic sonotrode, and
    a direction of vibration is parallel to an axis extending through center points of the two holes.

7. The method according to claim 1, wherein the ball is made to undergo torsional vibrations via an ultrasonic sonotrode.

8. The method according to claim 1, wherein
    the ball is introduced into the two holes or deformed into the two holes,
    the ball projects over at least one of the two holes after being plastically deformed as a result of which a form fit arises between the connecting element produced by the ultrasonic plastic deformation of the ball and at least one of the first and second components.

9. The method according to claim 1, wherein the ball is plastically formed such that, after the plastic deformation, the ball projects over at least one of the two holes in a mushroom-shape.

10. The method according to claim 1, wherein the ball is plastically formed such that, after the plastic deformation, the ball projects over at least one of the two holes in a mushroom-shape.

11. The method according to claim 10, wherein the energy introduced into the ball via the ultrasound is introduced into the ball from a side of the through-hole.

12. The method according to claim 1, wherein the two holes are both through-holes.

13. The method according to claim 1, wherein
ultrasonic energy is introduced into the ball from one side of the ball and is resisted from an opposing side of the ball via a die tool, and
the ball is plastically deformed into an indentation in the die tool.

14. The method according to claim 1, further comprising the act of:
sucking the ball into a recess in an ultrasonic sonotrode via a suction device integrated in the ultrasonic sonotrode or arranged on the ultrasonic sonotrode.

15. The method according to claim 1, further comprising the act of:
guiding the ultrasonic sonotrode, via a robot, and exerting a force required for the plastic forming of the ball at least in part by the robot and transferring the force via the ultrasonic sonotrode onto the ball.

16. A method of forming a component connection, the method comprising the acts of:
providing a first component having a through-hole;
providing a second component having a through-hole;
plastically deforming a ball, via ultrasound, such that the ball connects the first and second components by projecting over the through-hole of the first component in a form-fitting manner and extending through the through-hole of the first component into the hole provided in the second component, wherein
the first and second components rest against one another,
the through-holes of the first and second components are arranged substantially concentrically in relation to one another, and
the ball has a shape and size that prevents the ball from spanning through the first and second components, prior to the plastically deforming of the ball.

17. The method according to claim 16, wherein the act of plastically deforming the ball comprises the acts of:
sucking the ball into a recess of an ultrasonic sonotrode;
guiding the ultrasonic sonotrode via a robot which exerts a force onto the ball via the ultrasonic sonotrode; and
causing the ball to undergo vibrations via the ultrasonic sonotrode, wherein said vibrations are in a direction of oscillation parallel to an axis extending through center points of the two holes or are torsional vibrations.

* * * * *